United States Patent [19]

Hüttlin

[11] 4,320,089
[45] Mar. 16, 1982

[54] BOTTOM SCREEN FOR FLUIDIZED BED APPARATUS

[76] Inventor: Herbert Hüttlin, Lörracher Strasse 14, 7853 Steinen, Fed. Rep. of Germany

[21] Appl. No.: 131,565

[22] Filed: Mar. 19, 1980

[30] Foreign Application Priority Data

Mar. 30, 1979 [DE] Fed. Rep. of Germany ....... 2912780

[51] Int. Cl.³ .............................. B01J 8/36; B01J 8/44
[52] U.S. Cl. .................................... 422/140; 34/57 A; 34/57 B; 118/DIG. 5; 422/143; 432/58
[58] Field of Search ....................... 422/140, 143, 311; 34/10, 57 A, 57 B; 427/213; 432/58; 118/DIG. 5

[56] References Cited

U.S. PATENT DOCUMENTS

| | | | |
|---|---|---|---|
| 3,190,627 | 6/1965 | Goins | 34/10 |
| 3,394,468 | 7/1968 | Zeller | 34/57 A |
| 3,494,046 | 2/1970 | Harkreader | 34/10 |
| 4,080,927 | 3/1978 | Brown | 427/213 |

FOREIGN PATENT DOCUMENTS

| | | |
|---|---|---|
| 2738485 | 3/1979 | Fed. Rep. of Germany . |
| 904703 | 8/1962 | United Kingdom . |
| 1321715 | 6/1973 | United Kingdom . |
| 1360526 | 7/1974 | United Kingdom . |

Primary Examiner—Bradley Garris
Attorney, Agent, or Firm—Karl W. Flocks; A. Fred Starobin

[57] ABSTRACT

A fluidized bed apparatus comprises a container 18 and a bottom screen 16. The screen 16 comprises a perforated plate 28 having a plurality of large openings therein above each of which is secured a perforated cone 34. Fluid blown through a duct 12 passes through the perforations in the plate 28 and the perforations in the cones 34 into material 10 which is thereby fluidized. Circulation of the material 10 is rendered more uniform and the risk of damage lessened.

9 Claims, 5 Drawing Figures

BOTTOM SCREEN FOR FLUIDIZED BED APPARATUS

The invention relates to a bottom screen for fluidized bed apparatus.

In a known fluidized bed apparatus (DE-OS No. 27 38 485), a rotor, which consists of a perforated wide-angled cone with a sharp-angled cone mounted centrally thereon, is arranged above a perforated bottom plate. Rotation of the rotor causes the solid particles of the material to be handled to be subjected to a centrifugal force whereby they are moved into the vicinity of a container wall surrounding the perforated bottom plate and the rotor. On the way, and particularly in an annular zone adjacent the container wall, the material is picked up by a stream of air which is blown through the perforated bottom plate and then through the perforated rotor but in particular through the annular zone between the outer edge of the rotor and the wall of the container. The solid particles of the material are carried upwards by the rising stream of air, then fall down under the effect of gravity in the central zone of the container, and finally drop once more on to the rotor. The further mixing of the material thus achieved is advantageous for a very wide variety of fluidized bed equipment such as fluidized bed mixers, driers, reactors and granulators.

However, it has not hitherto been possible to deal with certain material satisfactorily in fluidized bed apparatus, since none of the known bottom screens is able to provide a treatment that is uniform and yet does not damage the material too much. This is particularly true in the drying and surface treatment of seed material in pellet form which, in the damp condition, has a fluid surface and therefor poor flow characteristics.

The object of the present invention is to enable substances including such difficult materials to be treated in fluidized bed installations such as fluidized bed driers, granulators, film-coating apparatus and the like.

According to the invention, this object is achieved by a bottom screen for fluidized bed apparatus comprising a perforated bottom plate provided with a plurality of openings of major area and a plurality of perforated cones secured side by side one above each said opening in the bottom plate.

For the purposes of the present invention the term "cone" will be understood to mean any slim conical or cone-like structure, without this being limited to a geometrically precise conical shape. For example, the cones may have a non-circular such as an oval or polygonal cross-sectional shape. Nor is it necessary for the cones to terminate in a sharp point; they may also have an approximately frusto-conical or frusto-pyramidal shape. However, for manufacturing and operational reasons, more or less geometrically precise cones are generally preferred.

By means of the invention, the material to be treated in the fluidized bed apparatus can be circulated in a particularly uniform manner without becoming damaged. Instead of a single fluidized bed, a plurality of beds, depending upon the number of cones, can be formed, and these beds may intersect and penetrate each other to varying degrees.

In an arrangement that has proved particularly effective, the height of the cones is two to three times greater than their base diameter. This corresponds to a cone angle of exactly 20° to exactly 30°. The preferred cone angle is 25° to 28°.

It has also proved advantageous if at least five cones are provided, and the ratio of the diameter of each cone to the diameter of the bottom screen is from 1:5 to 1:8. In this arrangement it is expedient if one cone is arranged centrally on the bottom plate and the other cones are disposed around the central cone.

If the bottom plate is arranged within a cylindrical or frusto-conical container wall of circular basic outline as is usual in fluidized bed apparatus, then the cones, if not particularly great in number, are not able permanently to influence the movement of the material at all points and particularly in the angle between the bottom plate and the container wall. Hence there remain zones in which the movement of the material is mainly influenced only by the air or the gas that flows upwardly through the bottom plate at the sides of the cones. However, such zones can be avoided by arranging deflector elements of gibbous rectangular outline in the angle between the bottom plate and the container wall. Each element is of symmetrical shape in relation to the vertical plane of symmetry between two adjacent cones, and has a line extending along this plane of symmetry.

An adjustable throttle member is expediently associated with each of the openings in the bottom plate. In this way, the stream of air or gas which enters the material to be handled by way of the individual cones can be so adjusted that air or gas flows through the material at all points in a substantially uniform manner.

Each throttle member may be movable up and down, for example, within a bell arranged below the bottom plate, and may be downwardly biased by a spring. In this case, the throttle members increase their throttling action themselves when the stream of air through the associated bell exceeds a certain strength.

Finally, for when the bottom screen of the invention is used in a fluidized bed granulator or fluidized bed film-coating apparatus, it is advantageous if spraying nozzles, which are connected to a fluid-carrying pipe, are arranged on the cones. The spraying nozzles are advantageously arranged at the apices of the cones and are designed to spray a fluid in an angular zone of at least 90° that is symmetrical in relation to the axis of the cone concerned.

Embodiments of the invention will now be described in greater detail with reference to the accompanying diagrammatic drawings, in which.

Figure 1:
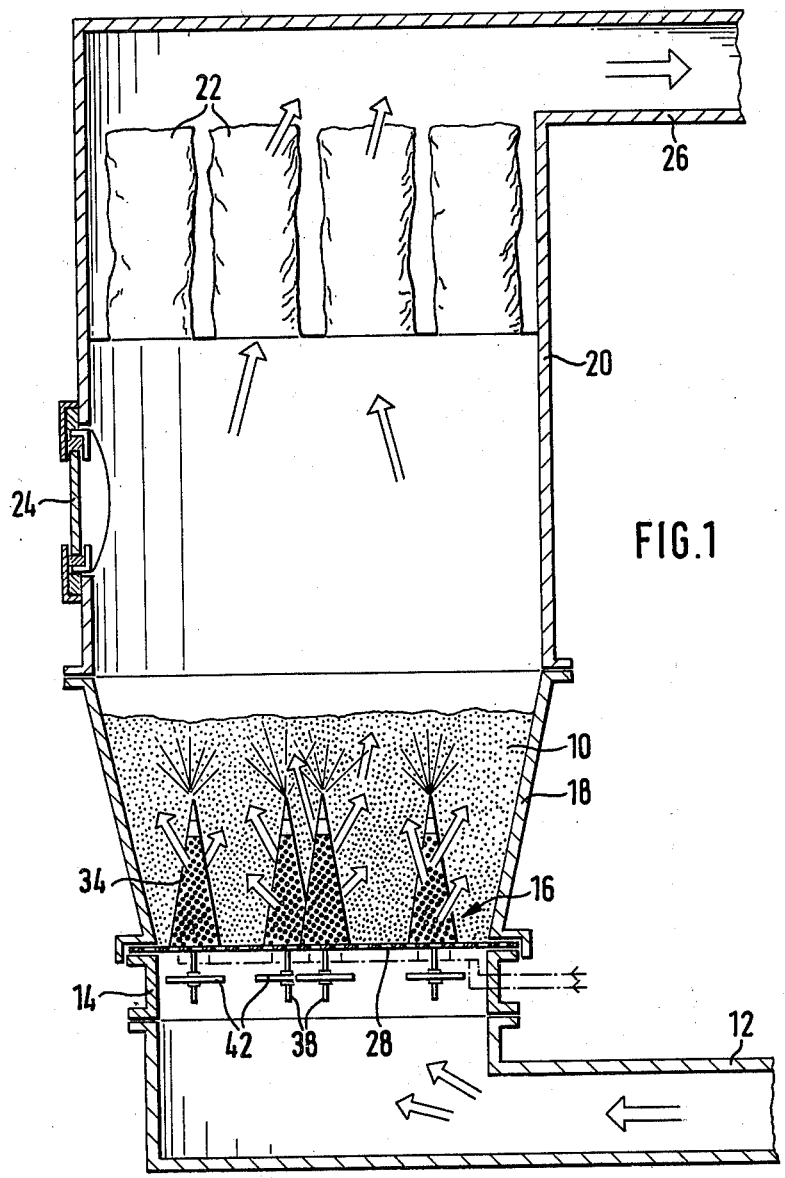
FIG. 1 is a vertical axial section through a fluidized bed apparatus comprising a bottom screen in accordance with the invention.

The fluidized bed apparatus illustrated in FIG. 1 is designed to provide pelleted seed material 10 with a coating. The pelleting may consist in encasing each individual grain of material with a mixture of peat and nutritive substance. This case is fibrous and offers little resistance to friction. It is intended to be mechanically strengthened by the coating and to be protected against the premature penetration of moisture.

As shown in FIG. 1, the fluidized bed apparatus has an air supply port 12 which is connected to an air heater, not illustrated, comprising a blower. Secured on the air supply port 12 is an intermediate ring 14, arranged with its longitudinal axis A extending in the vertical direction; arranged coaxially with the intermediate ring and in superposed relationship thereto are a bottom screen 16, a frustoconical container wall 18, which widens upwardly, and a filter housing 20, these parts being attached to each other by means of screws. The filter housing 20 contains dust filters 22; below this housing is a window 24, and above it, an air-discharge port 26.

The bottom screen 16 incorporates a perforated bottom plate 28 of stainless steel, which, together with a mesh 30, also made of stainless steel and disposed on the bottom plate, is clamped between the intermediate ring 14 and the container wall 18. Whereas the perforation of the bottom plate 28 of FIGS. 2 to 5 is relatively coarse, the holes in the mesh 30 are small and close together so that the finest charge materials that may be treated cannot fall through it; the open portions of the mesh advantageously form 25% to 50% of its cross-section. As can be seen in particular from FIGS. 2 and 3, the bottom plate 28 and the meshing 30 have, in the illustrated example, six larger openings 32, one of which is disposed on the axis A, while the other five are arranged equidistantly around this axial opening.

Figure 2:
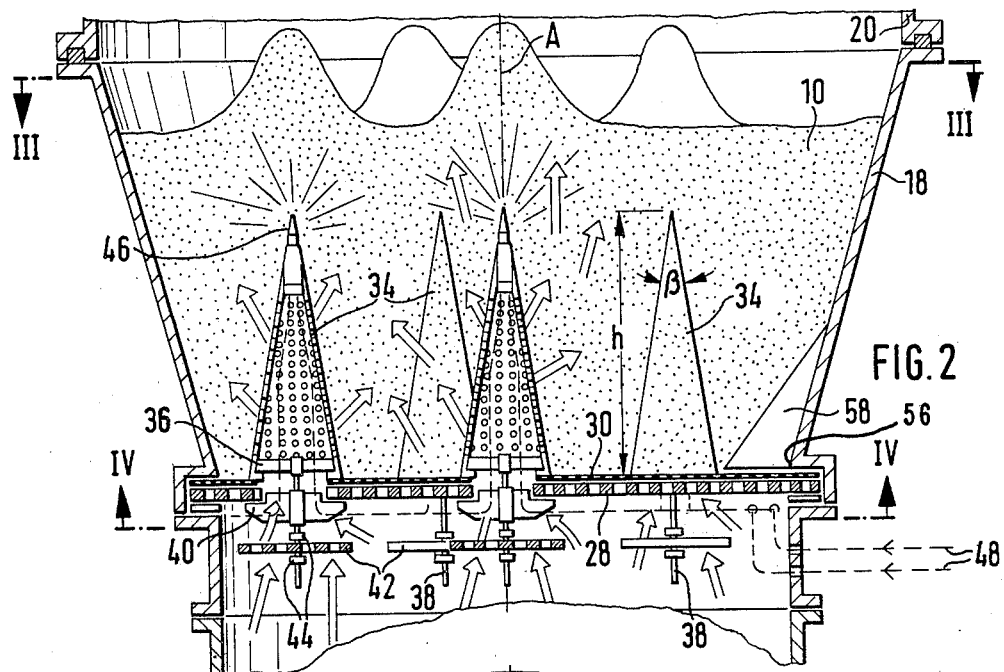
FIG. 2 shows, on a larger scale, a portion from FIG. 1.
Figure 4:
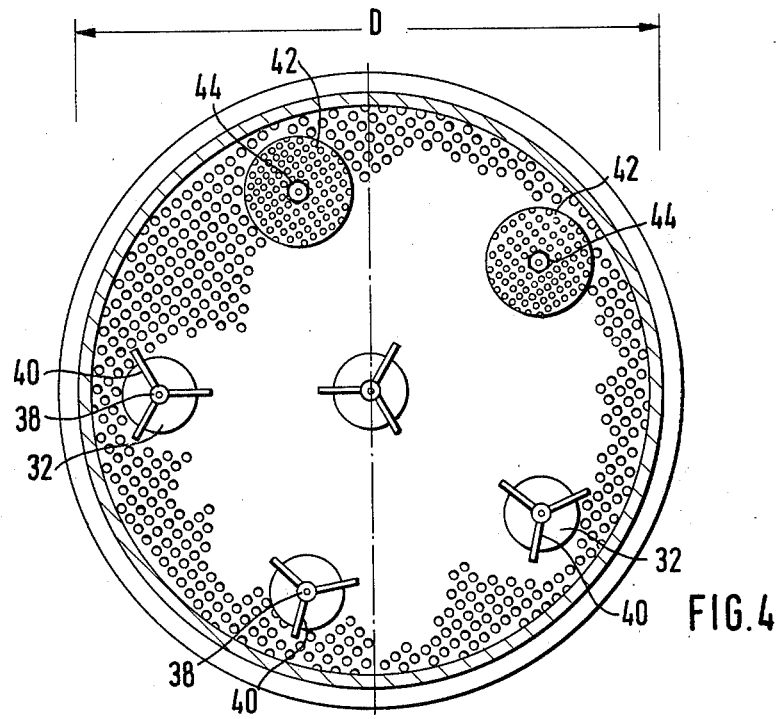
FIG. 4 is a horizontal cross-section along the line IV—IV of FIG. 2.

Mounted above each of the openings 32 is a cone 34 of perforated stainless steel sheet. Secured at the bottom of each cone 34 is a spider 36, from the middle of which a threaded pin 38 extends axially downwards through the associated opening 32. Screwed on to each threaded pin 38 is a second spider 40 which bears against the underside of the bottom plate 28 and thus clamps the associated cone 34. As shown in FIGS. 2 and 4, a throttle member 42 is arranged on each threaded pin 38 below each spider 40. As seen in FIGS. 2 and 4, each throttle member 42 takes the form of a perforated circular plate, which is firmly clamped between two nuts 44 on the associated threaded pin 38 at an adjustable distance from the bottom plate 28.

Figure 5:
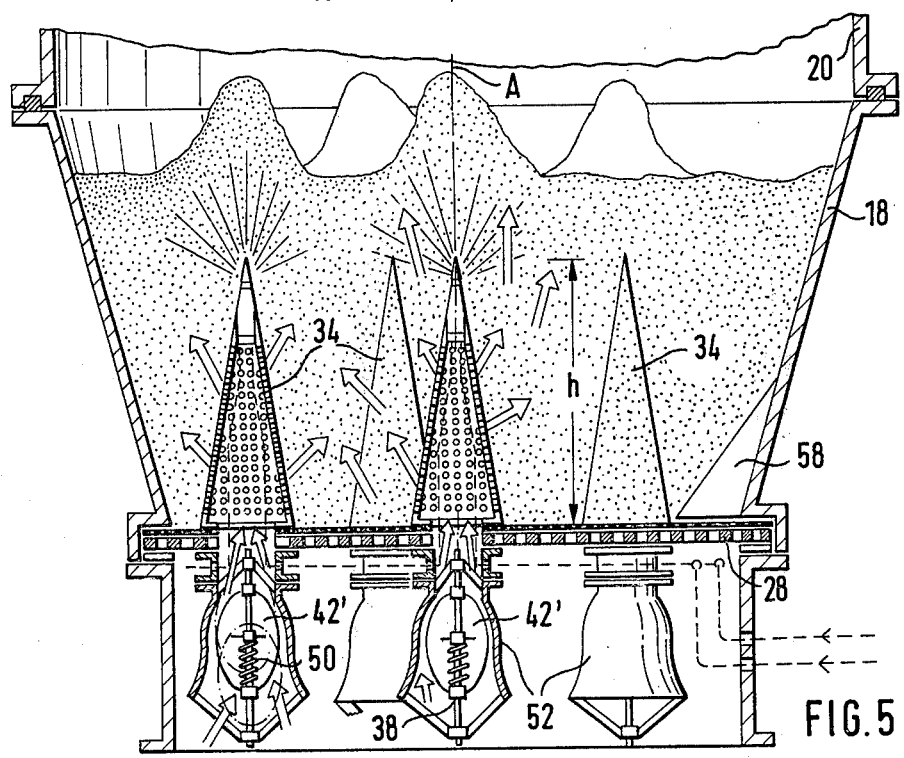
FIG. 5 is a view corresponding to FIG. 2 but showing a modified form of the bottom screen in accordance with the invention.

As illustrated in the case of the individual cones in FIGS. 2 and 5, these cones 34 may each have at their apices a spraying nozzle 46; these nozzles are connected to a common fluid-carrying pipe 48, and each is designed to spray fluid in a conical zone which is coaxial with the cone 34 concerned and, in the illustrated example, has an angular range of approximately 150° to 180°.

The arrangement illustrated in FIG. 5 differs in that the plate-like throttle members 42 illustrated in FIGS. 2 and 4 are replaced by ovoidal throttle members 42' which are axially displaceable on a smooth portion of the associatd threaded pin 38 and are each downwardly biased by a spring 50. As shown in FIG. 5, each throttle member 42' is surrounded by a bell 52; the throttle member and the bell define an annular gap which narrows when the throttle member 42' is moved upwards against the force of the associated spring 50.

Figure 3:
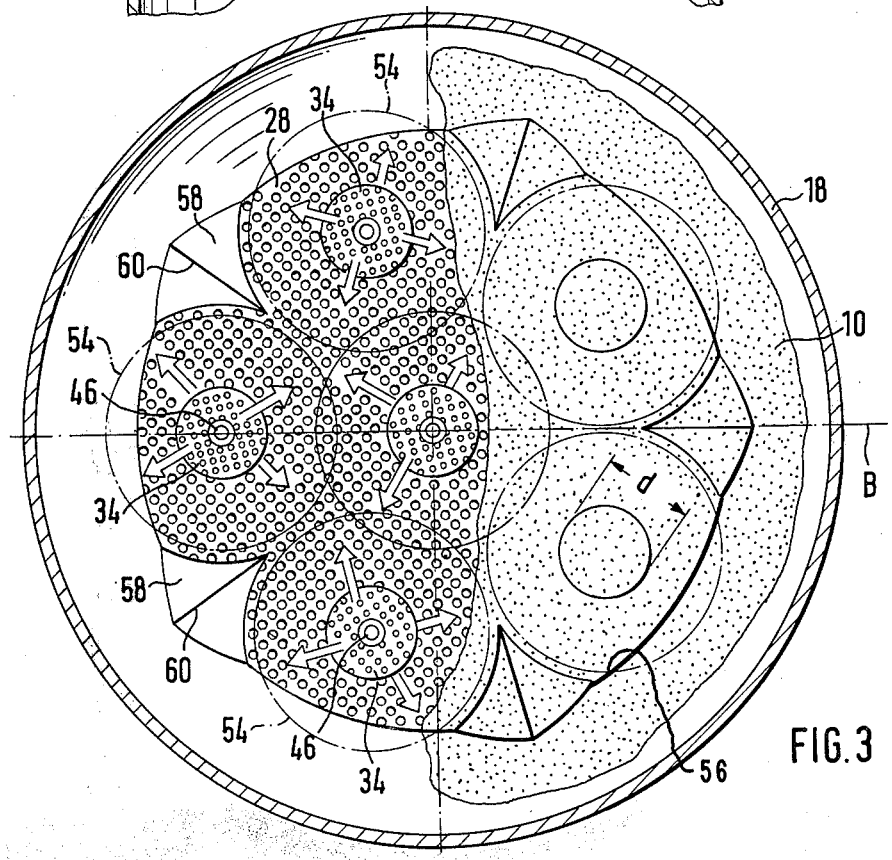
FIG. 3 is a horizontal cross-section along the line III—III of FIG. 2.

In the two arrangements as shown in FIGS. 2 to 4 on the one hand and FIG. 5 on the other, the cones 34 each have a base diameter d which is exactly one-sixth of the uncovered diameter D of the bottom plate 28 and approximately one half to one-third of the height h of the cone. The cones 34 may be provided with a mesh covering which corresponds to the mesh 30, but which is not illustrated so that the main parts of the cones may be seen more clearly.

When air or other gas is injected into the pelleted seed material 10 from the air supply port 12 and through the intermediate ring 14, the screen bottom 16 and the cones 34, the flow conditions illustrated by means of arrows in FIGS. 1 to 3 and 5 are set up. The effective zone of each individual cone 34 is indicated by a circle 54 in FIG. 3. The effective zone of the cone 34 arranged along the axis A intersects the effective zones of the cones arranged around it, so that in almost the entire space above the screen plate 28 flow conditions obtain which are influenced to varying degrees by the cones 34. In the illustrated example, only in the five wedge-shaped areas between the circles 54 and the lower edge 56 of the container wall 18 are there zones which would be reached only by streams of air directed substantially vertically downwards through the bottom plate 28 if only the cones 34 were arranged above the bottom plate 28. However, in the two examples illustrated, such wedge-shaped portions are covered by deflector elements 58 which are arranged in the angle between the bottom plate 28 and the container wall 18 and which are of symmetrical form in relation to the vertical plane of symmetry B between the two adjacent cones 34, each deflector element having an edge 60 disposed along this plane of symmetry. As shown in FIG. 3, the outline of each deflector element 58 has the form of a gibbous rectangle with two sides parallel with portions of the adjacent circles 54. The deflector elements 58 may be completely smooth as illustrated, but they may also be perforated so that air or gas can be caused to flow through them as in the case of the cones 34. In either case, the deflector elements 58 ensure that the seed material 10 or other material to be treated always finds it way back into the zone of influence of the cones 34.

I claim:

1. A fluidized bed apparatus comprising
a substantially planar bottom plate having apertures and provided with a plurality of openings therethrough,
and a plurality of perforated cones secured side by side with each said cone above one of said openings in said bottom plate, the height of said cones being from two to three times their base diameter.

2. The apparatus of claim 1 wherein the cones have an apex cone angle of 25° to 28°.

3. The apparatus of claim 1 which comprises at least five said cones and the ratio of the base diameter of each cone to the diameter of the bottom plate is from 1:5 to 1:8.

4. The apparatus of claim 3 wherein one said cone is arranged centrally on said bottom plate and the remaining said cones are arranged around said central cone.

5. A fluidized bed apparatus comprising
a container having a cylindrical or frusto-conical wall of circular contour,
a substantially planar apertured bottom plate arranged within said wall and provided with a plurality of spaced openings in said bottom plate,
a plurality of perforated cones secured side by side with each said cone above one of said openings in said bottom plate,
deflector elements of gibbous rectangular outline arranged in the angle between said bottom plate and said container wall, each element being of symmetrical shape in relation to the perpendicular plane of symmetry between two adjacent said cones and having an edge disposed along this plane of symmetry.

6. The apparatus of claims 1, 2, 3, or 5 wherein an adjustable throttle member is associated with each of said openings in said bottom plate.

7. A fluidized bed apparatus comprising
a substantially planar bottom plate having apertures and provided with a plurality of openings therethrough,
a plurality of perforated cones secured side by side with each said cone above one of said openings in said bottom plate,
an adjustable throttle member associated with each of said openings in said bottom plate,
each of said throttle members adapted to move up and down within a bell arranged below said bottom plate,
and a spring downwardly biasing each of said throttle members.

8. The apparatus of claim 1, 5, or 7 wherein spray nozzles connected to a fluid-carrying pipe are arranged on said cones.

9. The apparatus of claim 8 wherein said spray nozzles are arranged at the apices of said cones and are designed to spray a fluid in an angular zone of at least 90° that is symmetrical in relation to the axis of said cone concerned.

* * * * *